US012384660B2

(12) United States Patent
Vishal

(10) Patent No.: US 12,384,660 B2
(45) Date of Patent: Aug. 12, 2025

(54) STRUCTURE FOR CONSTRUCTING AN ELEVATOR SHAFT

(71) Applicant: Ruphavathy Vishal, Chennai (IN)

(72) Inventor: Ruphavathy Vishal, Chennai (IN)

(73) Assignee: Ruphavathy Vishal (IN)

( * ) Notice: Subject to any disclaimer, the term of this patent is extended or adjusted under 35 U.S.C. 154(b) by 140 days.

(21) Appl. No.: 18/374,076

(22) Filed: Sep. 28, 2023

(65) Prior Publication Data

US 2025/0108997 A1 Apr. 3, 2025

(51) Int. Cl.
*B66B 19/00* (2006.01)

(52) U.S. Cl.
CPC .................................... *B66B 19/00* (2013.01)

(58) Field of Classification Search
CPC ..... B66B 11/0005; B66B 19/00; E04F 17/005
See application file for complete search history.

(56) References Cited

FOREIGN PATENT DOCUMENTS

| | | | | | |
|---|---|---|---|---|---|
| CN | 106927334 | A | | 7/2017 | |
| CN | 207121321 | U | * | 3/2018 | |
| CN | 109098394 | A | * | 12/2018 | |
| CN | 111075155 | A | * | 4/2020 | |
| CN | 111395696 | A | | 7/2020 | |
| CN | 113417373 | A | * | 9/2021 | |
| CN | 112141850 | B | * | 5/2022 | ............. B66B 11/00 |
| CN | 217128856 | U | | 8/2022 | |
| CN | 109095330 | B | * | 8/2023 | ............. B66B 11/02 |
| EP | 4049958 | A1 | | 8/2022 | |
| WO | WO-2021057016 | A1 | * | 4/2021 | ......... B66B 11/0005 |

OTHER PUBLICATIONS

Machine Translation of WO 202157016.*

* cited by examiner

*Primary Examiner* — Diem M Tran
(74) *Attorney, Agent, or Firm* — Jason C. Cameron

(57) ABSTRACT

A structure 10 for constructing an elevator shaft is provided. The structure includes a first column 20 to withstand stress. The first column is constructed by coupling a first groove 30 to 'L' shaped sections 40. The 'L' shaped sections are interconnected by a semicircular section 50 forming at least one slot 60 at a junction of coupling between the 'L' shaped sections and the semi-circular section. The structure includes a second column 70 to provide reinforcement to the first column. The structure includes a base plate 140 including projections to secure the second column to the base plate via fasteners. The structure includes beams including a corresponding third groove 170 and a corresponding fourth groove 180. The corresponding third groove and the corresponding fourth groove are to receive a corresponding covering plate 190 and a corresponding right angled section 200 respectively to mount a corresponding sheet 210.

8 Claims, 6 Drawing Sheets

STRUCTURE FOR CONSTRUCTING AN ELEVATOR SHAFT

CROSS-REFERENCE TO RELATED APPLICATION

This Application claims priority from a Patent application filed in India having Patent Application No. 202341006420, filed on Feb. 1, 2023, and titled "A STRUCTURE FOR CONSTRUCTING AN ELEVATOR SHAFT".

FIELD OF INVENTION

Embodiments of the present disclosure relate to the field of elevators and more particularly to a structure for constructing an elevator shaft.

BACKGROUND

An elevator is a machine which transports people and freights between different levels of a structure. The structure may include a building, a maritime vessel and the like. The elevator may include a number of components, such as a cabin, cables, counterweights, guide rails and a motor. The cabin may be used for transporting the people and the freights in an enclosed manner. The motor may be coupled to the cabin via the cables to move the cabin. The guide rails may guide the cabin during motion and the counterweights may provide stability and balance to the cabin during the motion.

For mounting the counterweights, the cables, the guide rails, the cabin, and the motor, a support structure may be required. The support structure may include at least one of a reinforced cement concrete wall and a masonry wall of a predefined thickness. Construction of the support structure is a laborious task which may require skilled labors. Also, construction of the support structure may be a time consuming task. Further, the support structure may hamper aesthetics of the structure. Moreover, portability of the support structure is another point of concern.

Hence, there is a need for an improved structure for constructing an elevator shaft to address the aforementioned issue(s).

BRIEF DESCRIPTION

In accordance with an embodiment of the present disclosure, a structure for constructing an elevator shaft is provided. The structure includes a first column adapted to withstand stress acting in one or more directions. The first column is constructed by coupling a first groove to a plurality of 'L' shaped sections positioned adjacent to the first groove. The plurality of 'L' shaped sections are interconnected by a semicircular section forming at least one slot at a junction of coupling between the plurality of 'L' shaped sections and the semi-circular section. The structure also includes a second column positioned inside the first column. The second column is adapted to provide reinforcement to the first column. The second column includes at least five sides including a first side, a second side, a third side, a fourth side and a fifth side. The first side and the fifth side are in contact with at least one flange of the plurality of corresponding 'L' shaped sections. The second side, third side, and the fourth side are adapted to form an enclosed space with the semicircular section. The third side includes a second groove adapted to accommodate a first plurality of fasteners to secure the second column to the first column.

The structure further includes a base plate mechanically coupled to the second column. The base plate includes a plurality of projections adapted to secure the second column to the base plate via a second plurality of fasteners. The structure also includes a plurality of beams located above the base plate and mechanically coupled to the first column. The plurality of beams includes a corresponding third groove and a corresponding fourth groove. The corresponding third groove and the corresponding fourth groove are adapted to receive a corresponding covering plate and a corresponding right angled section respectively to mount a corresponding sheet in between the corresponding covering plate and the corresponding right angled section. The corresponding sheet is adapted to form an enclosed elevator shaft, thereby forming the structure for constructing the elevator shaft.

To further clarify the advantages and features of the present disclosure, a more explicit description of the disclosure will follow by reference to specific embodiments thereof, which are illustrated in the appended figures. It is to be appreciated that these figures depict typical embodiments of the disclosure and are therefore not to be considered limiting in scope. The disclosure will be described and explained with additional details with the appended figures.

BRIEF DESCRIPTION OF THE DRAWINGS

The disclosure will be described and explained with additional specificity and detail with the accompanying figures in which.

Figure 1:
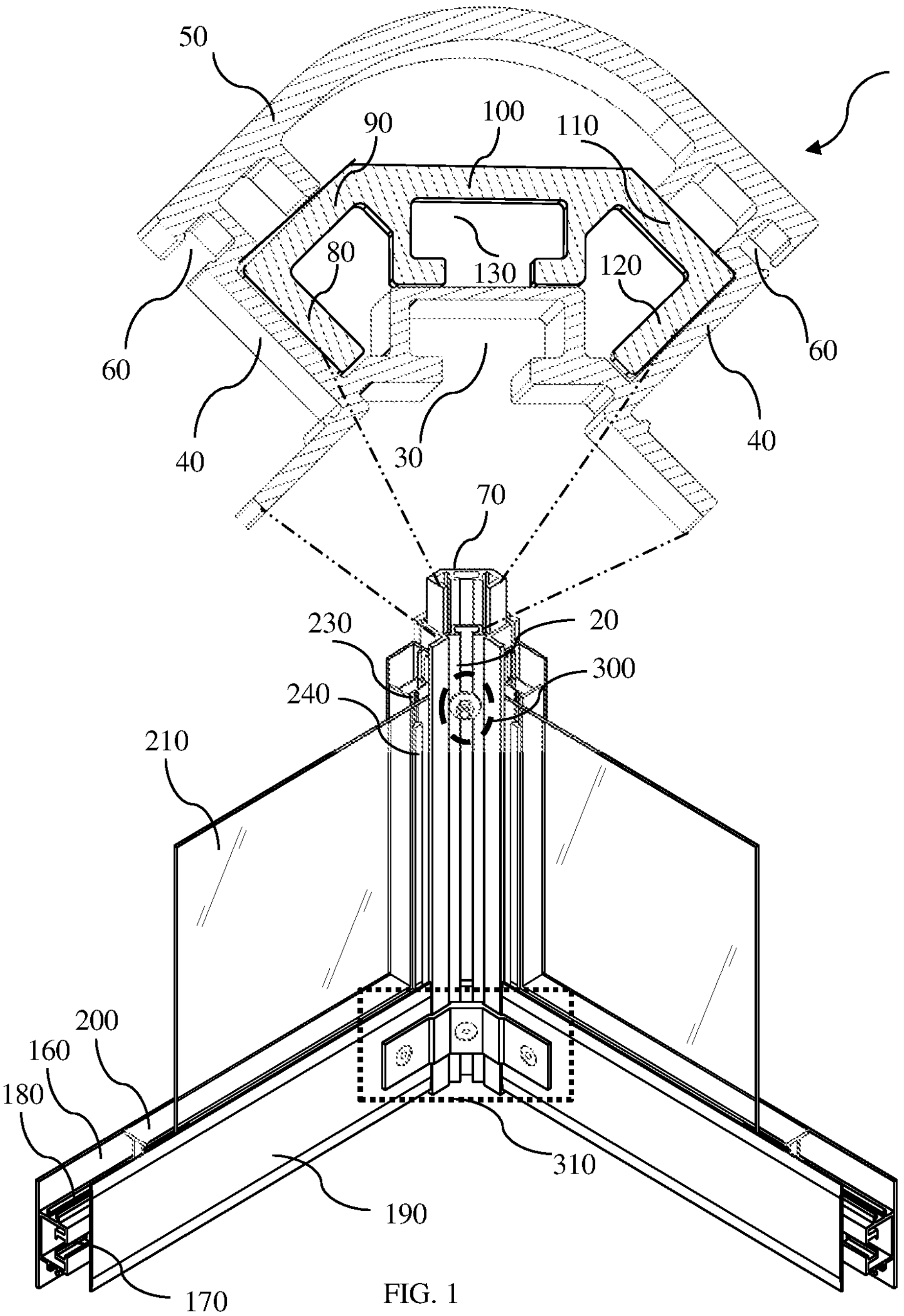
FIG. 1 is a schematic representation of a structure for constructing an elevator shaft in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

To promote an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms “comprises”, “comprising”, or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by “comprises . . . a” does not, without more constraints, preclude the existence of other devices, sub-systems, elements, structures, components, additional devices, additional sub-systems, additional elements, additional structures, or additional components. Appearances of the phrase “in an embodiment”, “in another embodiment” and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms “a”, “an”, and “the” include plural references unless the context clearly dictates otherwise.

Embodiments of the present disclosure relate to a structure for constructing an elevator shaft. The structure includes a first column adapted to withstand stress acting in one or more directions. The first column is constructed by coupling a first groove to a plurality of ‘L’ shaped sections positioned adjacent to the first groove. The plurality of ‘L’ shaped sections are interconnected by a semicircular section forming at least one slot at a junction of coupling between the plurality of ‘L’ shaped sections and the semi-circular section. The structure also includes a second column positioned inside the first column. The second column is adapted to provide reinforcement to the first column. The second column includes at least five sides including a first side, a second side, a third side, a fourth side and a fifth side. The first side and the fifth side are in contact with at least one flange of the plurality of corresponding ‘L’ shaped sections. The second side, third side, and the fourth side are adapted to form an enclosed space with the semicircular section. The third side includes a second groove adapted to accommodate a first plurality of fasteners to secure the second column to the first column. The structure further includes a base plate mechanically coupled to the second column. The base plate includes a plurality of projections adapted to secure the second column to the base plate via a second plurality of fasteners. The structure also includes a plurality of beams located above the base plate and mechanically coupled to the first column. The plurality of beams includes a corresponding third groove and a corresponding fourth groove. The corresponding third groove and the corresponding fourth groove are adapted to receive a corresponding covering plate and a corresponding right angled section respectively to mount a corresponding sheet in between the corresponding covering plate and the corresponding right angled section. The corresponding sheet is adapted to form an enclosed elevator shaft, thereby forming the structure for constructing the elevator shaft.

FIG. 1 is a schematic representation of a structure 10 for constructing an elevator shaft in accordance with an embodiment of the present disclosure. The structure 10 includes a first column 20 adapted to withstand stress acting in one or more directions. In one embodiment, the stress may include a plurality of types of stresses including a compression, tension, torsion, shear, and fatigue. In some embodiments, the one or more directions may include a vertical direction. In a specific embodiment, the one or more directions may include a horizontal direction.

Further, the first column 20 is constructed by coupling a first groove 30 to a plurality of ‘L’ shaped sections 40 positioned adjacent to the first groove 30. In one embodiment, the first groove 30 may be located in between the plurality of ‘L’ shaped sections 40. The plurality of ‘L’ shaped sections 40 are interconnected by a semicircular section 50 forming at least one slot 60 at a junction of coupling between the plurality of ‘L’ shaped sections 40 and the semi-circular section 50. The structure 10 also includes a second column 70 positioned inside the first column 20. The second column 70 is adapted to provide reinforcement to the first column 20.

Furthermore, the second column 70 includes at least five sides including a first side 80, a second side 90, a third side 100, a fourth side 110 and a fifth side 120. The first side 80 and the fifth side 120 are in contact with at least one flange of the plurality of corresponding ‘L’ shaped sections 40. The second side 90, third side 100, and the fourth side 110 are adapted to form an enclosed space with the semicircular section 50. The third side 100 includes a second groove 130 adapted to accommodate a first plurality of fasteners 300 to secure the second column 70 to the first column 20. The structure 10 further includes a base plate (FIG. 2, 140) mechanically coupled to the second column 70. The structure with base plate is further described in FIG. 2.

Figure 2:
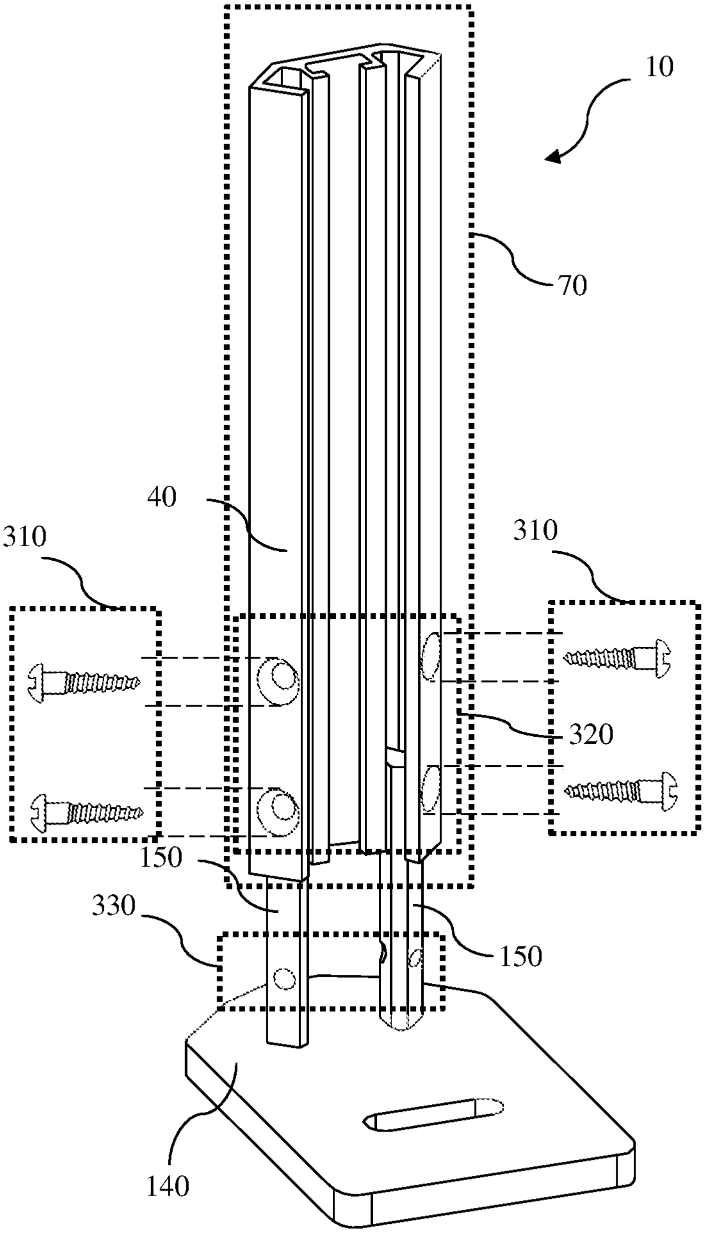
FIG. 2 is a schematic representation of one embodiment of the structure of FIG. 1, depicting detailed view of a base plate and one or more projections in accordance with an embodiment of the present disclosure.

FIG. 2 is a schematic representation of one embodiment of the structure of FIG. 1, depicting detailed view of a base plate and one or more projections in accordance with an embodiment of the present disclosure. The base plate 140 includes a plurality of projections 150 adapted to secure the second column 70 to the base plate 140 via a second plurality of fasteners 310. In some embodiments, the first plurality of fasteners 300 and the second plurality of fasteners 310 may include, but not limited to, screws, nails, nuts, bolts, washers, anchors, rivets and the like. The first plurality of fasteners 300 and the second plurality of fasteners 310 shown in the FIG. 2 is representation from example point of view. In one embodiment, the second column 70 may include a first plurality of holes 320 located on the plurality of ‘L’ shaped sections 40. In some embodiments, the first plurality of holes 320 may be adapted to concentrically align with respective cavities 330 located on the plurality of projections 150 when the second column 70 is placed over the plurality of projections 150. In such an embodiment, the second plurality of fasteners 310 may secure the second column 70 to the plurality of projections 150 by moving through the respective cavities 330 and the first plurality of holes 320 during fastening.

Referring back to FIG. 1, the structure 10 also includes a plurality of beams 160 located above the base plate 140 and mechanically coupled to the first column 20. The plurality of beams 160 includes a corresponding third groove 170 and a corresponding fourth groove 180. The corresponding third groove 170 and the corresponding fourth groove 180 are adapted to receive a corresponding covering plate 190 and a corresponding right angled section 200 respectively to mount a corresponding sheet 210 in between the corresponding covering plate 190 and the corresponding right angled section 200.

Moreover, in one embodiment, the corresponding sheet 210 may include, but not limited to, a poly carbonate sheet, an acrylic sheet and the like. In one embodiment, the right angled section 200 may include a track 230 including a liner 240 adapted to interface the sheet 210 with the right angled section 200. In one embodiment, the liner 240 may include, but not limited to, a hot liner, a dry liner, a finned liner and the like. The corresponding sheet 210 is adapted to form an enclosed elevator shaft, thereby forming the structure 10 for constructing the elevator shaft.

Figure 3:
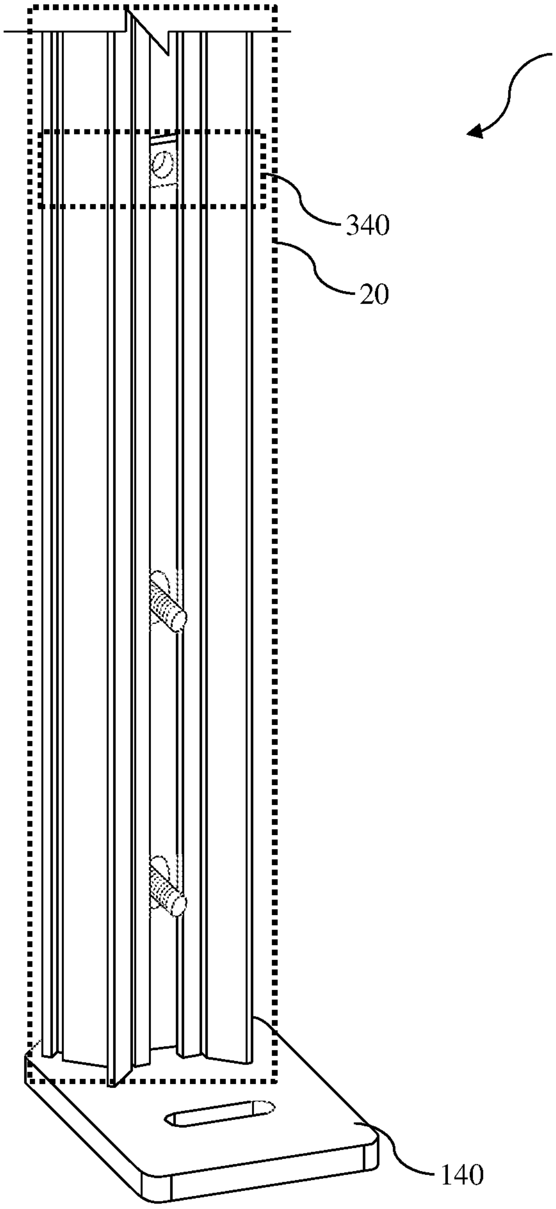
FIG. 3 is a schematic representation of another embodiment of the structure of FIG. 1, depicting positioning of a first column over a second column above the base plate in accordance with an embodiment of the present disclosure.

FIG. 3 is a schematic representation of another embodiment of the structure 10 of FIG. 1, depicting positioning of the first column 20 over the second column 70 above the base plate 140 in accordance with an embodiment of the present disclosure. In one embodiment, the first column 20 may include a second plurality of holes 340 positioned on the third side 10. In such an embodiment, the second groove 130 of the second column 70 may be secured to the first column 20 by running the first plurality of fasteners 300 through the second groove 130 and the second plurality of holes 340 located on the first column 20. Operational arrangement of the plurality of beams 160 with respect to the first column 20 is shown in FIG. 4.

Figure 4:
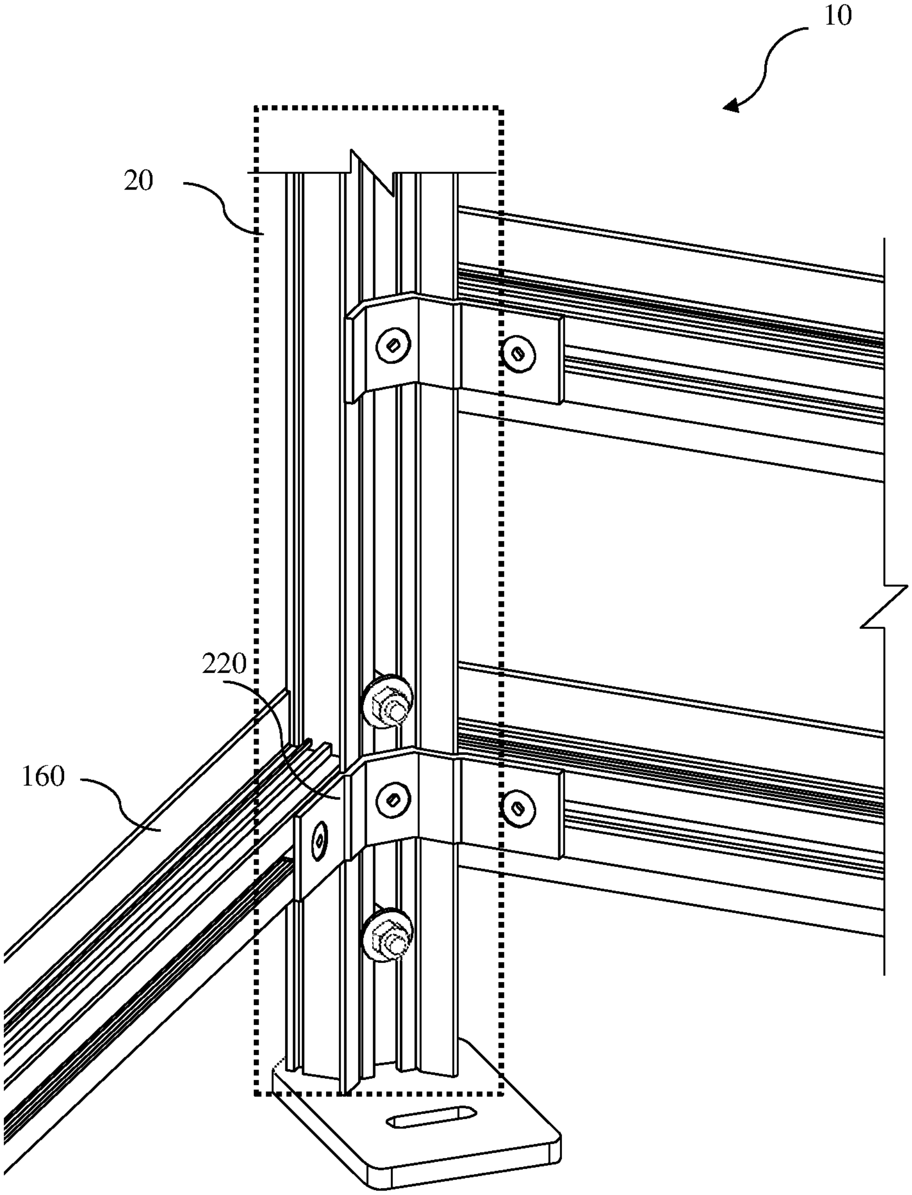
FIG. 4 is a schematic representation of yet another embodiment of the structure of FIG. 1, depicting operational arrangement of a plurality of beams with respect to the first column in accordance with an embodiment of the present disclosure.
Figure 5:
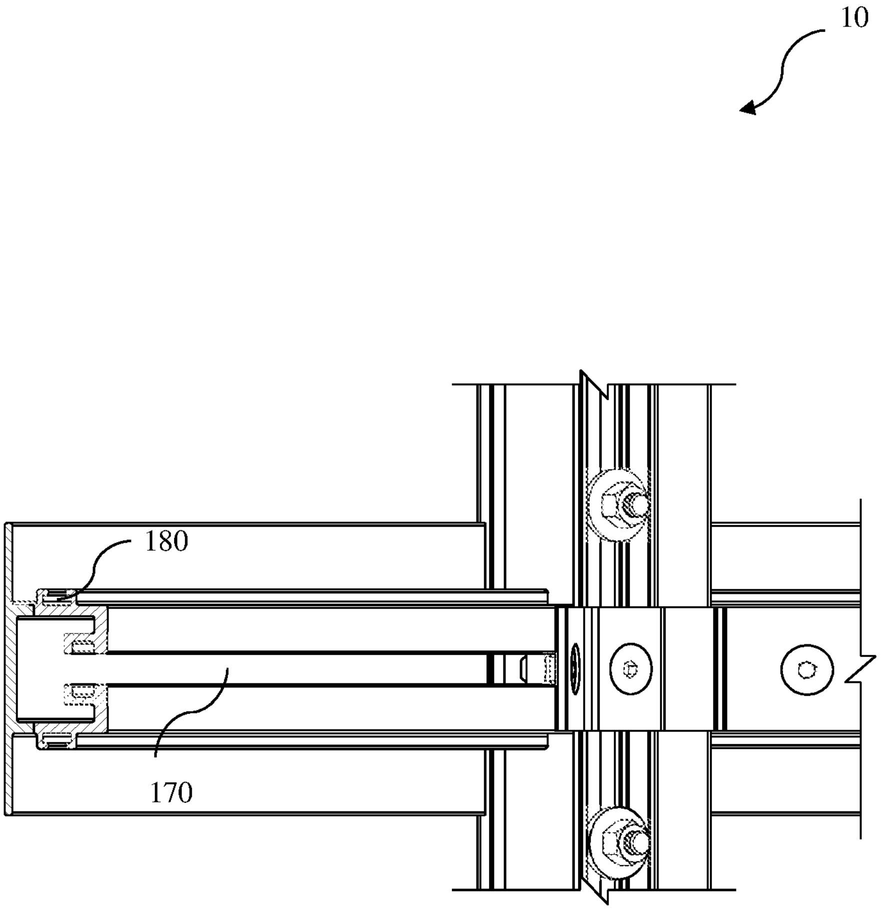
FIG. 5 is a schematic representation of yet another embodiment of the structure of FIG. 1, depicting detailed diagram of a corresponding third groove, and a corresponding fourth groove in accordance with an embodiment of the present disclosure.

FIG. 4 is a schematic representation of yet another embodiment of the structure 10 of FIG. 1, depicting operational arrangement of the plurality of beams 160 with respect to the first column 20 in accordance with an embodiment of the present disclosure. In one embodiment, the plurality of beams 160 may be mechanically coupled to the first column 20 orthogonally. In some embodiments, the plurality of beams 160 may be coupled to the first column 20 via one or more corresponding brackets 220. Detailed diagram of the corresponding third groove 170 and the corresponding fourth groove 180 is shown in FIG. 5.

Figure 6:
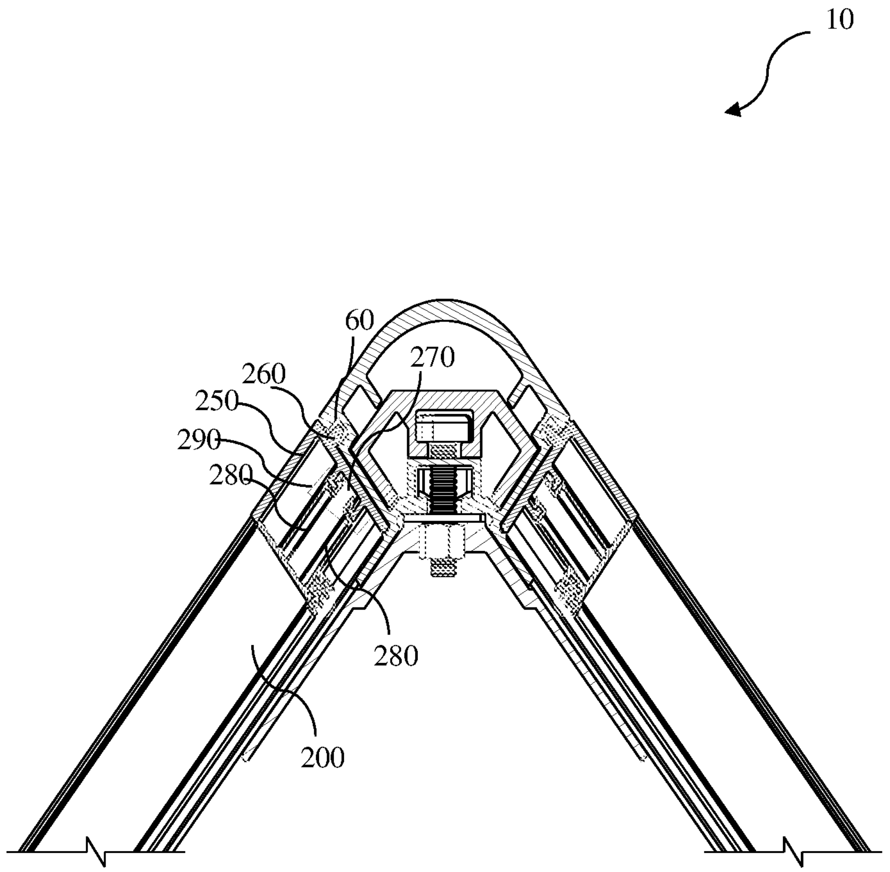
FIG. 6 is a schematic representation of yet another embodiment of the structure of FIG. 1, depicting coupling of at least one slot with a right angled section in accordance with an embodiment of the present disclosure.

FIG. 6 is a schematic representation of yet another embodiment of the structure 10 of FIG. 1, depicting coupling of the at least one slot 60 with the right angled section 200 in accordance with an embodiment of the present disclosure. In one embodiment, the at least one slot 60 may be adapted to couple with the right angled section 200 through an angle section 250 including a protrusion 260 adapted to interlock with the at least one slot 60. In such an embodiment, the angle section 250 may include a fifth groove 270 adapted to interlock with a pair of flanges 280 associated with the right angled section 200 to secure the right angled section 200 to the angle section 250. In one embodiment, the pair of flanges 280 may include at least two notches 290 to grip the pair of flanges 280 to the fifth groove 270.

Various embodiments of the structure for constructing the elevator shaft described above enable various advantages. Construction of the elevator shaft using the first column, the second column, the base plate, and the plurality of beams provides modularity to the elevator shaft, thereby enabling effortless mounting of the elevator shaft in an optimum time duration. The elevator shaft is capable of being assembled onsite which may further reduce transportation cost and complexity of installation. Presence of mechanical coupling between the right angled section and the at least one slot reduces the number of fasteners required to construct the elevator shaft, thereby reducing formation of the mechanical vibrations on the structure along with ensuring structural strength. The work force required for constructing the elevator shaft is minimal, thereby enabling further cost reduction. The first column, the second column, the base plate, and the plurality of beams are made up of lightweight materials, thereby reducing overall weight of the elevator shaft. The elevator shaft is capable of providing superior aesthetics to the structure. Further, the elevator shaft is capable of being assembled and dismantled multiple times, thereby ensuring portability of the same. Additionally, the elevator shaft is capable of being retrofitted to any of the structures that are already existing.

It will be understood by those skilled in the art that the foregoing general description and the following detailed description are exemplary and explanatory of the disclosure and are not intended to be restrictive thereof. While specific language has been used to describe the disclosure, any limitations arising on account of the same are not intended.

The figures and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and is not limited to the manner described herein. Moreover, the actions of any flow diagram need not be implemented in the order shown; nor do all the acts need to be necessarily performed. Also, those acts that are not dependent on other acts may be performed in parallel with the other acts. The scope of embodiments is by no means limited by these specific examples.

I claim:

1. A structure (10) for constructing an elevator shaft comprising:

a first column (20) adapted to withstand stress acting in one or more directions, wherein the first column (20) is constructed by coupling a first groove (30) to a plurality of 'L' shaped sections (40) positioned adjacent to the first groove (30), wherein the plurality of 'L' shaped sections (40) are interconnected by a semi-circular section (50) forming at least one slot (60) at a junction of coupling between the plurality of 'L' shaped sections (40) and the semi-circular section (50);

a second column (70) positioned inside the first column (20), wherein the second column (70) is adapted to provide reinforcement to the first column (20), wherein the second column (70) comprises at least five sides comprising a first side (80), a second side (90), a third side (100), a fourth side (110) and a fifth side (120), wherein the first side (80) and the fifth side (120) are in contact with at least one flange of the plurality of corresponding 'L' shaped sections (40), wherein the second side (90), third side (100), and the fourth side (110) are adapted to form an enclosed space with the semicircular section (50), wherein the third side (100) comprises a second groove (130) adapted to accommodate a first plurality of fasteners (300) to secure the second column (70) to the first column (20);

a base plate (140) mechanically coupled to the second column (70), wherein the base plate (140) comprises a plurality of projections (150) adapted to secure the second column (70) to the base plate (140) via a second plurality of fasteners (310); and a plurality of beams (160) located above the base plate (140) and mechanically coupled to the first column (20), wherein the plurality of beams (160) comprises a corresponding third groove (170) and a corresponding fourth groove (180), wherein the corresponding third groove (170) and the corresponding fourth groove (180) are adapted to receive a corresponding covering plate (190) and a corresponding right angled section (200) respectively to mount a corresponding sheet (210) in between the corresponding covering plate (190) and the corresponding right angled section (200), wherein the corresponding sheet (210) is adapted to form an enclosed elevator shaft, thereby forming the structure (10) for constructing the elevator shaft, wherein the at least one slot (60) is adapted to couple with the right angled section (200) through an angle section (250) comprising a protrusion (260) adapted to interlock with the at least one slot (60).

2. The structure (10) as claimed in claim 1, wherein the one or more directions comprises a vertical direction.

3. The structure (10) as claimed in claim 1, wherein the one or more directions comprises a horizontal direction.

4. The structure (10) as claimed in claim 1, wherein the plurality of beams (160) are mechanically coupled to the first column (20) orthogonally.

5. The structure (10) as claimed in claim 1, wherein the plurality of beams (160) are coupled to the first column (20) via one or more corresponding brackets (220).

6. The structure (10) as claimed in claim 1, wherein the right angled section (200) comprises a track (230) comprising a liner (240) adapted to interface the sheet (210) with the right angled section (200).

7. The structure (10) as claimed in claim 1, wherein the angle section (250) comprises a fifth groove (270) adapted to interlock with a pair of flanges (280) associated with the right angled section (200) to secure the right angled section (200) to the angle section (250).

8. The structure (10) as claimed in claim 7, wherein the pair of flanges comprises at least two notches (290) to grip the pair of flanges (280) to the fifth groove (270).

* * * * *